US012155991B2

(12) United States Patent
Ren et al.

(10) Patent No.: US 12,155,991 B2
(45) Date of Patent: Nov. 26, 2024

(54) ELECTRONIC DEVICE WITH A FUNCTION OF SOUND

(71) Applicant: AAC Microtech (Changzhou) Co., Ltd., Changzhou (CN)

(72) Inventors: Zhang Ren, Shenzhen (CN); Zhiwei Zhong, Shenzhen (CN); Qi Wang, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 223 days.

(21) Appl. No.: 18/073,531

(22) Filed: Dec. 1, 2022

(65) Prior Publication Data

US 2024/0073584 A1 Feb. 29, 2024

Related U.S. Application Data

(63) Continuation of application No. PCT/CN2022/115648, filed on Aug. 30, 2022.

(51) Int. Cl.

| | |
|---|---|
| ***H04R 1/24*** | (2006.01) |
| ***H04R 1/02*** | (2006.01) |
| ***H04R 1/34*** | (2006.01) |
| ***H04R 7/12*** | (2006.01) |
| ***H04R 7/18*** | (2006.01) |
| ***H04R 9/02*** | (2006.01) |
| ***H04R 9/04*** | (2006.01) |
| ***H04R 9/06*** | (2006.01) |

(52) U.S. Cl.
CPC ............... *H04R 1/24* (2013.01); *H04R 1/028* (2013.01); *H04R 1/345* (2013.01); *H04R 7/127* (2013.01); *H04R 7/18* (2013.01); *H04R 9/025* (2013.01); *H04R 9/046* (2013.01); *H04R 9/063* (2013.01); *H04R 2499/11* (2013.01)

(58) Field of Classification Search
CPC .......... H04R 1/24; H04R 1/028; H04R 1/345; H04R 7/127; H04R 7/18; H04R 9/025; H04R 9/046; H04R 9/063; H04R 2499/11
See application file for complete search history.

(56) References Cited

U.S. PATENT DOCUMENTS

2009/0003632 A1* 1/2009 Lin .......................... H04R 1/24 381/182
2015/0139479 A1* 5/2015 Lai .......................... H04R 9/025 381/412
2018/0132033 A1* 5/2018 Lee .......................... H04R 3/14

* cited by examiner

*Primary Examiner* — Jason R Kurr
(74) *Attorney, Agent, or Firm* — W&G Law Group

(57) ABSTRACT

The present invention provides an electronic device with a function of sound including a housing assembly and a coaxial speaker. The coaxial speaker includes a frame, a magnetic circuit system, a first and a second vibration system. The first vibration system includes a first diaphragm and a first voice coil, the second vibration system includes a second diaphragm and a second voice coil. The first diaphragm generates treble sound. The second diaphragm generates bass sound. The electronic device further includes a sound guiding channel including a first channel leading out the treble sound and a second channel communicating with the first channel. The second channel combines the treble sound from the first channel with the bass sound generated by the second diaphragm and outputs them to the outside of the housing assembly. The electronic device with a function of sound of the present enhances the effect of the treble sound.

10 Claims, 5 Drawing Sheets

ELECTRONIC DEVICE WITH A FUNCTION OF SOUND

FIELD OF THE PRESENT INVENTION

The present invention relates to the field of electro-acoustic conversion, and more particularly, to an electronic device with a function of sound.

DESCRIPTION OF RELATED ART

In related art, the electronic device with a function of sound includes a housing assembly and the coaxial speaker mounted on the housing assembly, and the coaxial speaker includes a first vibration system and a second vibration system located coaxially with the first vibration system. The second vibration system is arranged around the first vibration system. The first diaphragm is used for generating treble sound. The second diaphragm is used for generating bass sound. The coaxial speaker further includes a sound guiding channel guiding a sound generated by the coaxial speaker to an outside of the electronic device. The treble sound of the first vibration system and the bass sound of the second vibration system are respectively derived from their respective acoustic channels. However, limited by the size of coaxial speaker and the influence between treble and bass sound, the effect of the treble sound is weakened, which resulting in a lack of treble sound in electronic devices.

Therefore, it is desired to provide a new electronic device with a function of sound which can overcome the above problems.

SUMMARY

In view of the above, the embodiments of the present invention provide a new electronic device with a function of sound. By the present invention, the electronic device has a good treble sound effect.

The present invention provides an electronic device with a function of sound including a housing assembly and a coaxial speaker mounted in the housing assembly. The coaxial speaker includes a frame, a magnetic circuit system mounted under the frame, a first vibration system fixed on an inner side of the frame, and a second vibration system fixed on an outer side of the frame and around the first vibration system. The second vibration system locates coaxially with the first vibration system. The first vibration system includes a first diaphragm and a first voice coil driving the first diaphragm to generate sounds, and the second vibration system includes a second diaphragm and a second voice coil driving the second diaphragm to generate sounds. The magnetic circuit system includes a first magnetic gap and a second magnetic gap located outside the first magnetic gap. The first voice coil at least partially locates into the first magnetic gap. The second voice coil at least partially locates into the second magnetic gap. The first diaphragm is used for generating treble sound. The second diaphragm is used for generating bass sound. The electronic device with a function of sound further includes a sound guiding channel guiding sounds generated by the first diaphragm and the second diaphragm to an outside of the electronic device. The sound guiding channel includes a first channel leading out the treble sound generated by the first diaphragm and a second channel communicating with the first channel. The second channel combines the treble sound from the first channel with the bass sound generated by the second diaphragm and outputs them to the outside of the housing assembly.

As an improvement, the housing assembly includes a first housing accommodating the coaxial speaker and a second housing covered on the first housing, the coaxial speaker including an upper cover sealed and fixed with the frame, a first front cavity formed by the upper cover, the frame, and the first diaphragm, a second front cavity formed by the upper cover, the frame, and the second diaphragm, the first front cavity communicating with the first channel, the second channel including part of the second front cavity.

As an improvement, the second housing includes a body portion and an extension portion extending from the body portion to the upper cover and abutting against the upper cover, the first channel formed between the extension portion and the upper cover, the upper cover including a first hole communicating the first front cavity to the first channel.

As an improvement, a second hole is provided on the upper cover spaced apart from the first hole and communicating with the second front cavity.

As an improvement, the first housing includes a sound hole, the coaxial speaker including a lower cover mounted with the upper cover and a sound guiding member fixed with the upper cover and the lower cover and communicating to the sound hole, the second channel formed by a portion of the second front cavity proximal to the sound hole and a channel in the sound guiding member.

As an improvement, the coaxial speaker further includes a sealing member disposed between the sound hole and the sound guiding member.

As an improvement, a size of the first hole is larger than the size of the second hole, and a size of the portion of the first channel covering the first hole is larger than the size of the portion of the first channel covering the second hole.

As an improvement, the treble sound generated by the first diaphragm starts from the first front cavity and passing through the first hole, flowing through the first channel, and entering the second front cavity from the second hole, joining with the bass sound generated by the second diaphragm in second front cavity, and then transmitted by the sound guiding member to the sound hole for sounding.

As an improvement, the magnetic circuit system includes a magnetic bowl, the magnetic bowl including a side wall enclosing a receiving room and a bottom wall bending and extending from one end of the side wall, the magnetic circuit system further including a first magnet assembly disposed on one side of the magnetic bowl and a second magnet assembly disposed on the other side of the magnetic bowl, the first magnet assembly including a first magnet, the first magnetic gap formed between the first magnet and the side wall of the magnetic bowl, the second magnet assembly including a second magnet and a third magnet located outside the second magnet and forming the second magnetic gap with the second magnet.

BRIEF DESCRIPTION OF THE DRAWINGS

Many aspects of the exemplary embodiments can be better understood with reference to the following drawing. The components in the drawing are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of the present invention more apparent, the present invention is described in further detail together with the figures and the embodiments. It should be understood the specific embodiments described hereby is only to explain the disclosure, not intended to limit the disclosure.

Figure 1:
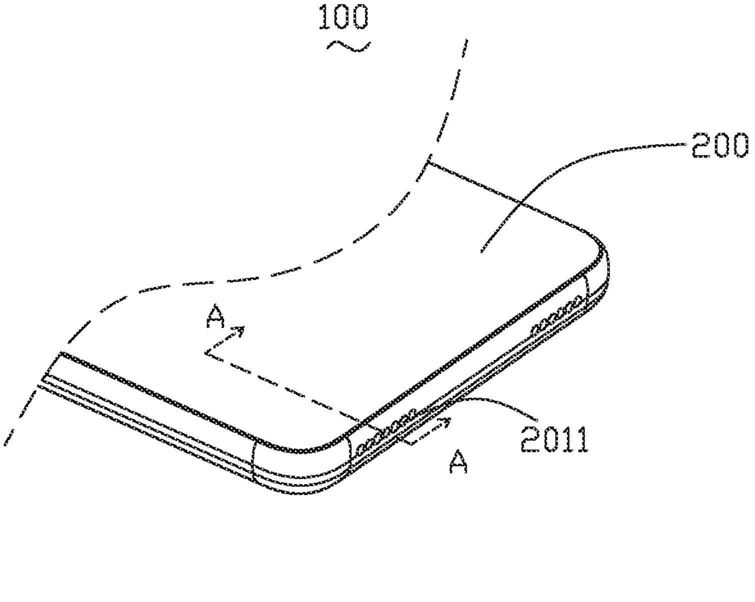
FIG. 1 is a partially illustrative isometric view of an electronic device with a function of sound in accordance with one embodiment of the present invention.
Figure 2:
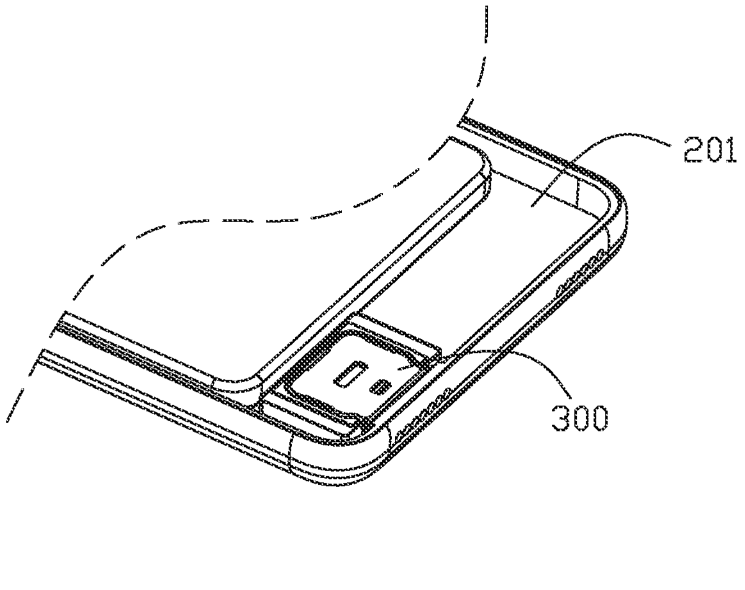
FIG. 2 is a partially illustrative isometric view of the first housing and the coaxial speaker of the electronic device with a function of sound of FIG. 1.
Figure 3:
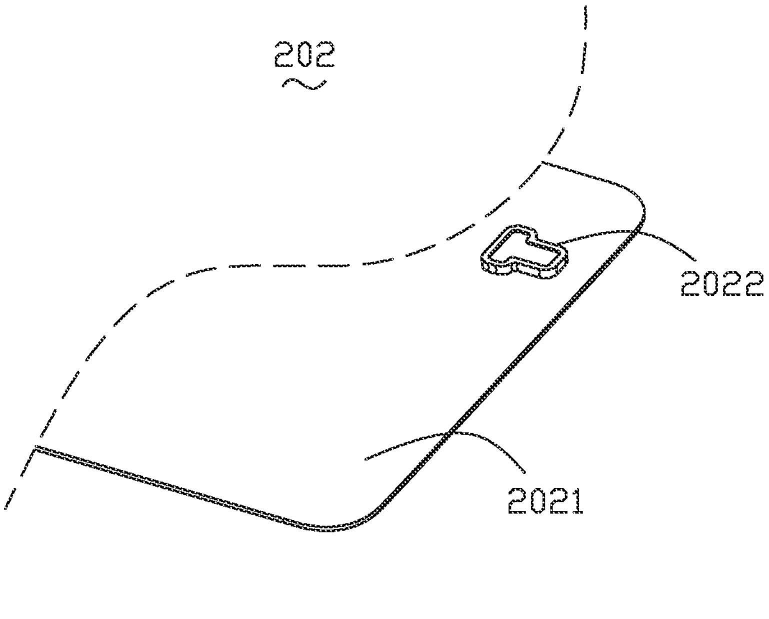
FIG. 3 is a partially illustrative isometric view of the second housing of the electronic device with a function of sound of FIG. 1.
Figure 4:
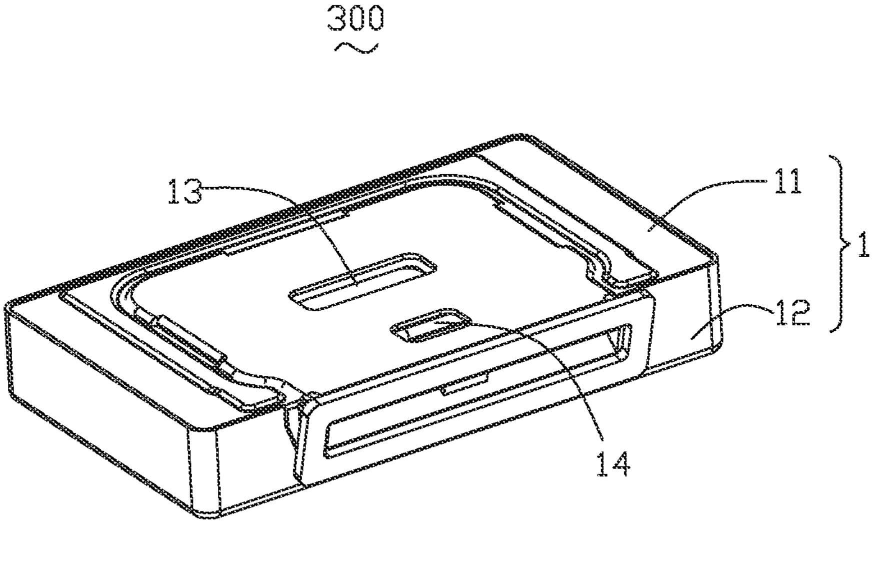
FIG. 4 is an illustrative isometric view of the coaxial speaker of the electronic device with a function of sound of FIG. 1.
Figure 5:
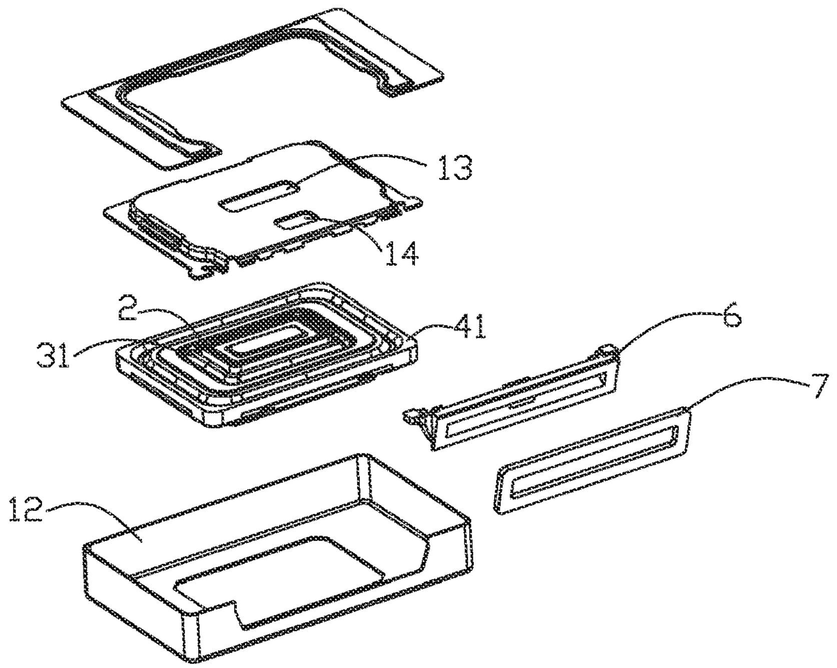
FIG. 5 is a partially exploded view of the coaxial speaker of FIG. 4.
Figure 6:
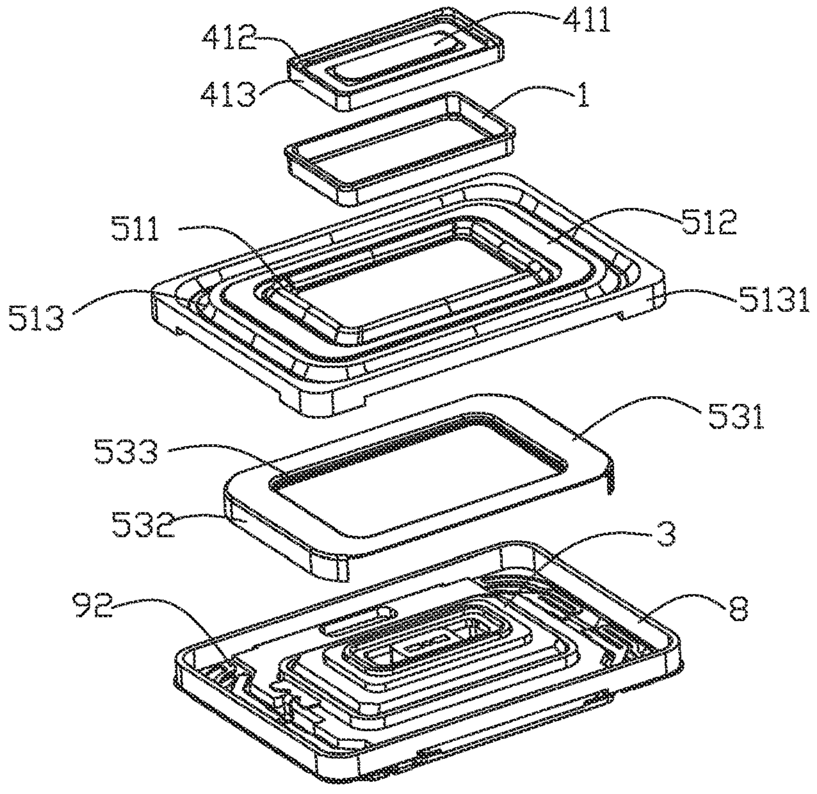
FIG. 6 is a partially exploded view of some members of the coaxial speaker of FIG. 4.
Figure 7:
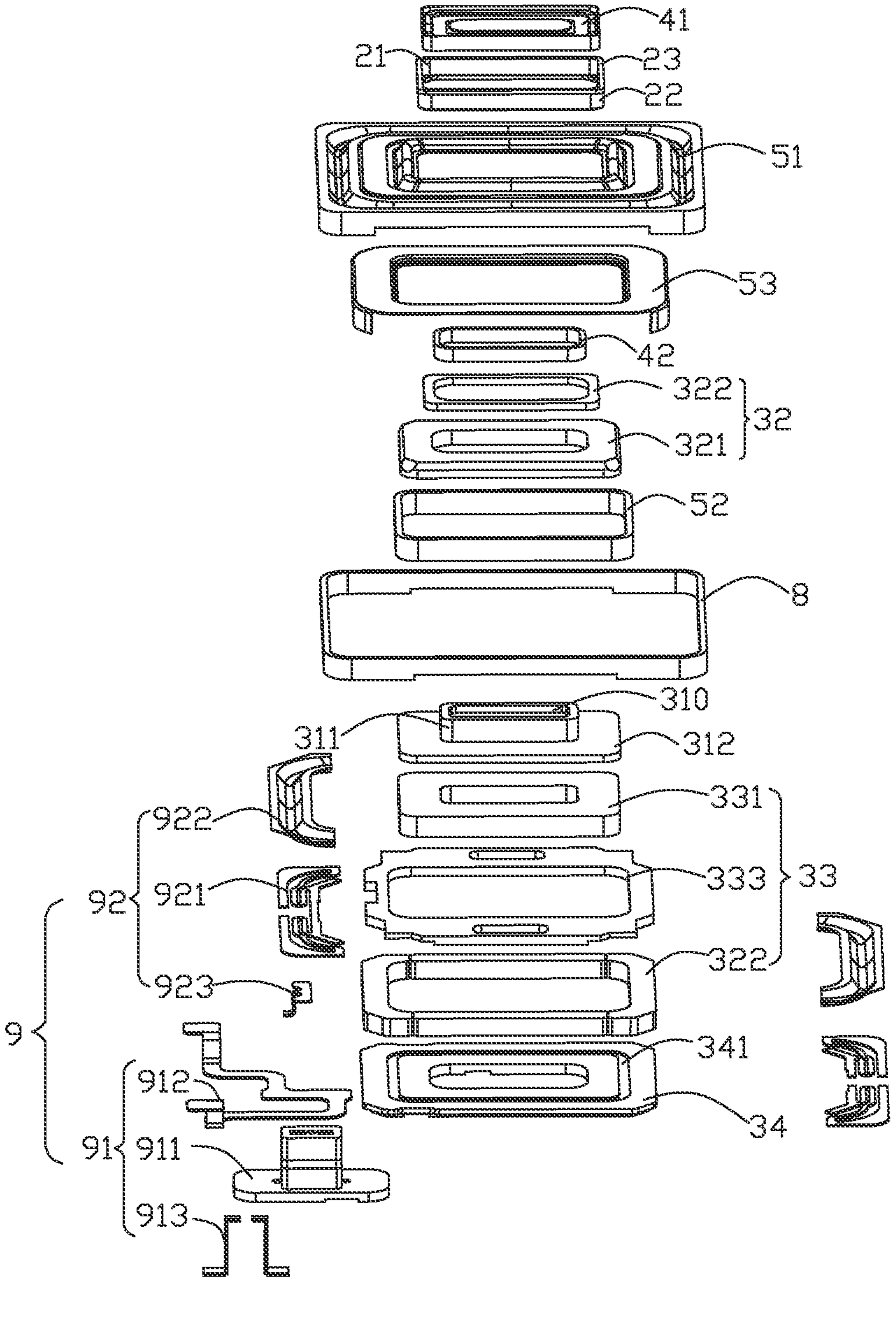
FIG. 7 is an exploded view of some members of the coaxial speaker of FIG. 6.
Figure 8:
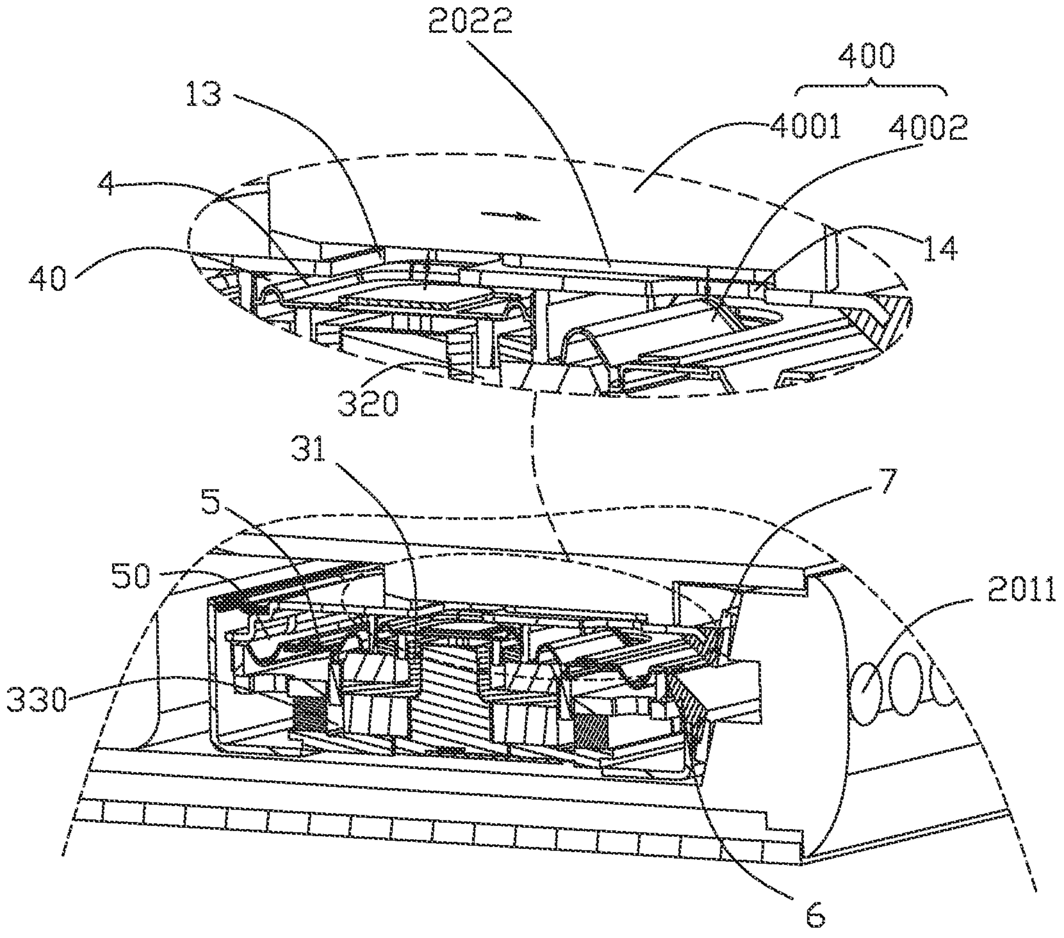
FIG. 8 is a partially illustrative cross-sectional view of the coaxial speaker taken along line A-A of FIG. 1.

Referring to the FIGS. 1-8, the present invention provides an electronic device with a function of sound 100. The electronic device with a function of sound 100 includes a housing assembly 200 and a coaxial speaker 300 mounted in the housing assembly 200. The electronic device with a function of sound 100 can be mobile phones, tablets, etc.

The housing assembly 200 includes a first housing 201 accommodating the coaxial speaker 300 and a second housing 202 covered on the first housing 201. The first housing 201 includes a sound hole 2011. The second housing 202 includes a body portion 2021 and an extension portion 2022 extending from the body portion 2021. The extension portion 2022 encloses to form a closed structure.

The coaxial speaker 300 includes a cover 1, a frame 2 received in the cover 1, a magnetic circuit system 3 mounted under the frame 2, a first vibration system 4 fixed on an inner side of the frame 2, a second vibration system 5 fixed on an outer side of the frame 2, a sound guiding member 6 fixed on the cover 1 and communicating to the sound hole 2011, a sealing member 7 disposed between the sound hole 2011 and the sound guiding member 6, a support shelf 8 mounted with the magnetic circuit system 3, a circuit assembly 9 providing electrical connection. The second vibration system 5 locates around the first vibration system 4 and is arranged coaxially with the first vibration system 4.

The cover 1 includes an upper cover 11 sealed and fixed with the frame 2 and a lower cover 12 mounted with the upper cover 11. The upper cover 11 provides a first hole 13 and a second hole 14 spaced apart from the first hole 13. A size of the first hole 13 is larger than the size of the second hole 14.

The frame 2 is substantially rectangular, and includes an inner side wall 21, an outer side wall 22 opposite to the inner side wall 21, and a top wall 23 connecting the inner side wall 21 and the outer side wall 22. The top wall 23 is sealed connected with the upper cover 11. The first vibration system 4 is fixed on the inner side wall 21 of the frame 2, and the second vibration system 5 is fixed on the outer side wall 22 of the frame 2.

The magnetic circuit system 3 includes a magnetic bowl 31, a first magnet assembly 32 disposed on one side of the magnetic bowl 31, and a second magnet assembly 33 disposed on the other side of the magnetic bowl 31. The first magnet assembly 32 is arranged coaxially with the second magnet assembly 33. The magnetic bowl 31 includes a side wall 311 enclosing a receiving room 310 and a bottom wall 312 bending and extending from one end of the side wall 311. The first magnet assembly 32 includes a first magnet 321 and a pole plate 322 stacked on the first magnet 321. A space between the first magnet 321, the pole plate 322 and the side wall 311 of the magnetic bowl 31 forms a first magnetic gap 320. The bottom wall 312 of the magnetic bowl 31 supports the first magnet 321. The second magnet assembly 33 includes a second magnet 331, a third magnet 332 located outside the second magnet 331 and forming a second magnetic gap 330 with the second magnet 331, and a magnetic guiding plate 333 located on the third magnet 332. The bottom wall 312 of the magnetic bowl 31 is stacked above the second magnet 331. The first magnet 321 is disposed opposite to the second magnet 331. The magnetic circuit system 3 further includes a yoke 34 supporting the second magnet 331 and the third magnet 332.

The first magnet 321, the second magnet 331 and the third magnet 332 are magnetized along a vibration direction of the coaxial speaker 300, and the first magnet 321 and second magnet 331 are set opposite each other with a same pole, that is, the first magnet 321 and the second magnet 331 are magnetized in opposite directions. The second magnet 331 and third magnet 332 are magnetized in opposite directions. In present embodiment, the first magnet 321, the pole plate 322, the second magnet 331, the third magnet 332, and the magnetic guiding plate 333 can all be hollow annular structures.

The first vibration system 4 includes a first diaphragm 41 and a first voice coil 42 driving the first diaphragm 41 to generate sounds. The first voice coil 42 at least partially locates into the first magnetic gap 320. The first diaphragm 41 is used for generating treble sound, and a sound direction of the first diaphragm 41 is upward along the vibration direction, that is, the sound direction of the first diaphragm 41 is in front of the coaxial speaker 300. A first front cavity 40 is formed by the upper cover 11, the frame 2, and the first diaphragm 41. The first diaphragm 41 includes a first dome 411 and a first suspension 412 surrounding the first dome 411. An outer edge of the first suspension 412 provides a first fixing portion 413. The first fixing portion 413 is attached on the inner side wall 21 of the frame 2. Furthermore, the first fixing portion 413 is partially sandwiched between the frame 2 and the pole plate 322.

The second vibration system 5 includes a second diaphragm 51, a second voice coil 52 driving the second diaphragm 51 to generate sounds, and a voice coil support 53 connecting the second diaphragm 51 to the second voice coil 52. The second voice coil 52 at least partially locates into the second magnetic gap 330. The second diaphragm 51 is used for generating bass sound, and the sound direction of the second diaphragm 51 is upward along the vibration direction, that is, the sound direction of the second diaphragm 51 is in front of the coaxial speaker 300. A second front cavity 50 is formed by the upper cover 11, the frame 2, and the second diaphragm 51. The second diaphragm 51 includes a second suspension 511, a second dome 512 surrounding the second suspension 511, and a third suspension 513 surrounding the second dome 512. The voice coil support 53 connects the second suspension 511, the second dome 512, the third suspension 513 to the second voice coil 52. One end of the second suspension 511 proximal to the first diaphragm 41 is fixed with the outer side wall 22 of the frame 2 or/and the first magnet 321. The third suspension 513 includes a second fixing portion 5131.

A recessing portion 341 is provided on the yoke 34 corresponding to a position of the second voice coil 52 to provide enough vibration space for the second voice coil 52.

The electronic device with a function of sound 100 further includes a sound guiding channel 400 guiding a sound generated by the coaxial speaker 300 to an outside of the electronic device 100. The sound guiding channel 400 includes a first channel 4001 leading out the treble sound generated by the first diaphragm 41 and a second channel 4002 communicating with the first channel 4001. The second channel 4002 combines the treble sound from the first channel 4001 with the bass sound generated by the second diaphragm 51 and outputs them to the outside of the housing assembly 200. In detail, the extension portion 2022 of the second housing 202 abuts against the upper cover 11 to form the first channel 4001. A size of the portion of the first channel 4001 covering the first hole 13 is larger than the size of the portion of the first channel 4001 covering the second hole 14. The first front cavity 40 communicates with the first channel 4001 through the first hole 13. The second channel 4002 includes part of the second front cavity 50. The part of the second front cavity 50 is a portion of the second front cavity 50 proximal to the sound hole 2011. The first channel 4001 communicates with the second channel 4002 through the second hole 14. The treble sound generated by the first diaphragm 41 starts from the first front cavity 40 and passing through the first hole 13, flowing through the first channel 4001, and entering the second front cavity 50 from the second hole 14, joining with the bass sound generated by the second diaphragm 51 in second front cavity 50, and then transmitted by the sound guiding member 6 to the sound hole 2011 for sounding.

The sound guiding member 6 is fixed between the cover 1 and the housing assembly 200. Specifically, a side of the sound guiding member 6 closed to the housing assembly 200 is fixed with the housing assembly 200 through the sealing member 7, and a channel in the sound guiding member 6 communicates to the sound hole 2011 of the cover 1. A top end of the side of the sound guiding member 6 proximal to the cover 1 is secured to the upper cover 11, and a bottom end of the side of the sound guiding member 6 proximal to the cover 1 is secured to the lower cover 12, so that the sound in the second front cavity 50 is transmitted out of the housing assembly 200 only through the sound guide member 6. The portion of the second front cavity 50 proximal to the sound hole 2011 and the channel in the sound guiding member 6 cooperatively forms the second channel 4002.

The support shelf 8 is an annular steel ring, and the second fixing portion 5131 of the third suspension 513 is fixedly connected to the support shelf 8. Specifically, the second fixing portion 5131 covers an upper surface and part of a side surface of the support shelf 8.

The circuit assembly 9 includes a first circuit board assembly 91 powering the first voice coil 42 and a second circuit board assembly 92 powering the second voice coil 52. The first circuit board assembly 91 includes an inserting member 911 located in a space enclosed by the side wall 311 of the magnetic bowl 31 and a first circuit board 912 disposed on a bottom part of the inserting member 911. Part of the first circuit board 912 is attached to an outer surface of the yoke 34. The first circuit board assembly 91 further includes a first terminal 913 passing through the inserting member 911. The first terminal 913 connects to the first circuit board 912. The first voice coil 42 is electrically connected with the first circuit board 912 through the first terminal 913.

The second circuit board assembly 92 connects the voice coil support 53 and the support shelf 8. The circuit board assembly 92 includes a second circuit board 921 and a support membrane 922 connected with the second circuit board 921. The second voice coil 52 is electrically connected to the second circuit board 921. Specifically, the second circuit board assembly 92 further includes a second terminal 923 connected to the second circuit board 921, and the second voice coil 52 is electrically connected to the second circuit board 921 through the second terminal 923. In this embodiment, the number of the second circuit board assembly 92 is two, and each second circuit board assembly 92 is arranged in a direction of a short axis of the coaxial speaker 300. In other embodiments, the position of the second circuit board assembly 92 may be determined according to the situation.

The voice coil support 53 includes a flat portion 531 attached to the second dome 512, a first extending portion 532 bending and extending from the flat portion 531 to the second circuit board 921 and connected to the second circuit board 921, and a second extending portion 533 bending and extending from the flat portion 531 to the second voice coil 52 and connected to the second voice coil 52.

Comparing with the related art, the present invention provides an electronic device with a function of sound including a housing assembly and a coaxial speaker mounted in the housing assembly. The coaxial speaker includes a frame, a magnetic circuit system mounted under the frame, a first vibration system fixed on an inner side of the frame, and a second vibration system fixed on an outer side of the frame and around the first vibration system. The second vibration system locates coaxially with the first vibration system. The first vibration system includes a first diaphragm and a first voice coil driving the first diaphragm to generate sounds, and the second vibration system includes a second diaphragm and a second voice coil driving the second diaphragm to generate sounds. The magnetic circuit system includes a first magnetic gap and a second magnetic gap located outside the first magnetic gap. The first voice coil at least partially locates into the first magnetic gap. The second voice coil at least partially locates into the second magnetic gap. The first diaphragm is used for generating treble sound. The second diaphragm is used for generating bass sound. The electronic device with a function of sound further includes a sound guiding channel guiding a sound generated by the first diaphragm and the second diaphragm to an outside of the electronic device. The sound guiding channel includes a first channel leading out the treble sound generated by the first diaphragm and a second channel communicating with the first channel. The second channel combines the treble sound from the first channel with the bass sound generated by the second diaphragm and outputs them to the outside of the housing assembly.

The electronic device with a function of sound of the present invention makes a treble air flow to be concentrated in a front pipe area, that is, concentrated in the first channel, and the treble and bass air flow to join in a common pipe area at the end, that is, join in the second channel, thus improving the effect of the treble sound and ensuring the unobstructed bass sound to the greatest extent.

It is to be understood, however, that even though numerous characteristics and advantages of the present exemplary embodiments have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An electronic device with a function of sound, comprising:
   - a housing assembly; and
   - a coaxial speaker mounted in the housing assembly, the coaxial speaker comprising:
     - a frame;
     - a magnetic circuit system mounted under the frame, the magnetic circuit system comprising a first magnetic gap and a second magnetic gap located outside the first magnetic gap;
     - a first vibration system fixed on an inner side of the frame, the first vibration system comprising a first diaphragm and a first voice coil driving the first diaphragm to generate sounds, the first voice coil at least partially located in the first magnetic gap, the first diaphragm used for generating treble sound; and
     - a second vibration system fixed on an outer side of the frame and around the first vibration system, the second vibration system located coaxially with the first vibration system, the second vibration system comprising a second diaphragm and a second voice coil driving the second diaphragm to generate sounds, the second voice coil at least partially located in the second magnetic gap, the second diaphragm used for generating bass sound;
     - wherein the electronic device with a function of sound further comprises a sound guiding channel guiding sounds generated by the first diaphragm and the second diaphragm to an outside of the electronic device, the sound guiding channel comprising a first channel leading out the treble sound generated by the first diaphragm and a second channel communicating with the first channel, the second channel combining the treble sound from the first channel with the bass sound generated by the second diaphragm and outputting them to the outside of the housing assembly.

2. The electronic device with a function of sound as described in claim 1, wherein the housing assembly comprises a first housing accommodating the coaxial speaker and a second housing covered on the first housing, the coaxial speaker comprising an upper cover sealed and fixed with the frame, a first front cavity formed by the upper cover, the frame, and the first diaphragm, a second front cavity formed by the upper cover, the frame, and the second diaphragm, the first front cavity communicating with the first channel, the second channel comprising part of the second front cavity.

3. The electronic device with a function of sound as described in claim 2, wherein the second housing comprises a body portion and an extension portion extending from the body portion to the upper cover and abutting against the upper cover, the first channel formed between the extension portion and the upper cover, the upper cover comprising a first hole communicating the first front cavity to the first channel.

4. The electronic device with a function of sound as described in claim 3, wherein a second hole is provided on the upper cover spaced apart from the first hole and communicating with the second front cavity.

5. The electronic device with a function of sound as described in claim 4, wherein the first housing comprises a sound hole, the coaxial speaker comprising a lower cover mounted with the upper cover and a sound guiding member fixed with the upper cover and the lower cover and communicating to the sound hole, the second channel formed by a portion of the second front cavity proximal to the sound hole and a channel in the sound guiding member.

6. The electronic device with a function of sound as described in claim 5, wherein the coaxial speaker further comprises a sealing member disposed between the sound hole and the sound guiding member.

7. The electronic device with a function of sound as described in claim 5, wherein a size of the first hole is larger than the size of the second hole, and a size of the portion of the first channel covering the first hole is larger than the size of the portion of the first channel covering the second hole.

8. The electronic device with a function of sound as described in claim 7, wherein the treble sound generated by the first diaphragm starts from the first front cavity and passing through the first hole, flowing through the first channel, and entering the second front cavity from the second hole, joining with the bass sound generated by the second diaphragm in second front cavity, and then transmitted by the sound guiding member to the sound hole for sounding.

9. The electronic device with a function of sound as described in claim 1, wherein the magnetic circuit system comprises a magnetic bowl, the magnetic bowl comprising a side wall enclosing a receiving room and a bottom wall bending and extending from one end of the side wall, the magnetic circuit system further comprising a first magnet assembly disposed on one side of the magnetic bowl and a second magnet assembly disposed on the other side of the magnetic bowl, the first magnet assembly comprising a first magnet, the first magnetic gap formed between the first magnet and the side wall of the magnetic bowl, the second magnet assembly comprising a second magnet and a third magnet located outside the second magnet and forming the second magnetic gap with the second magnet.

10. The electronic device with a function of sound as described in claim 9, wherein the first magnet, the second magnet and the third magnet are magnetized along a vibration direction of the coaxial speaker, and the first magnet and second magnet are set opposite each other with a same pole, the second magnet and third magnet are magnetized in opposite directions.

* * * * *